(12) United States Patent
Okanohara et al.

(10) Patent No.: US 9,990,587 B2
(45) Date of Patent: Jun. 5, 2018

(54) MACHINE LEARNING HETEROGENEOUS EDGE DEVICE, METHOD, AND SYSTEM

(71) Applicant: Preferred Networks, Inc., Tokyo (JP)

(72) Inventors: Daisuke Okanohara, Tokyo (JP); Justin B. Clayton, Menlo Park, CA (US); Toru Nishikawa, Tokyo (JP); Shohei Hido, Burlingame, CA (US); Nobuyuki Kubota, Foster City, CA (US); Nobuyuki Ota, Burlingame, CA (US); Seiya Tokui, Chiba (JP)

(73) Assignee: PREFERRED NETWORKS, INC., Tokyo (JP)

( * ) Notice: Subject to any disclaimer, the term of this patent is extended or adjusted under 35 U.S.C. 154(b) by 592 days.

(21) Appl. No.: 14/602,867

(22) Filed: Jan. 22, 2015

(65) Prior Publication Data

US 2016/0217388 A1    Jul. 28, 2016

(51) Int. Cl.
    *G06F 15/18*    (2006.01)
    *G06N 99/00*    (2010.01)
(52) U.S. Cl.
    CPC .................................. *G06N 99/005* (2013.01)
(58) Field of Classification Search
    CPC ............. G06N 5/04; G06N 7/005; G06N 5/02
    See application file for complete search history.

(56) References Cited

U.S. PATENT DOCUMENTS

| | | | |
|---|---|---|---|
| 8,429,103 B1 | 4/2013 | Aradhye et al. | |
| 2005/0169367 A1 | 8/2005 | Venetianer et al. | |
| 2007/0299946 A1 | 12/2007 | El-Damhougy | |
| 2008/0063236 A1* | 3/2008 | Ikenoue | G06K 9/32 382/103 |
| 2009/0240539 A1 | 9/2009 | Slawson et al. | |
| 2012/0182390 A1 | 7/2012 | Purvis et al. | |
| 2012/0201124 A1 | 8/2012 | Marques et al. | |
| 2013/0262349 A1* | 10/2013 | Bouqata | G06N 99/005 706/12 |

(Continued)

OTHER PUBLICATIONS

Search Report and Written Opinion dated Apr. 21, 2016 issued for International PCT Application No. PCT/US2016/014445 filed on Jan. 22, 2016.

(Continued)

*Primary Examiner* — Paulinho E Smith
(74) *Attorney, Agent, or Firm* — K&L Gates LLP

(57) ABSTRACT

A machine learning heterogeneous edge device, method, and system are disclosed. In an example embodiment, an edge device includes a communication module, a data collection device, a memory, a machine learning module, a group determination module, and a leader election module. The edge device analyzes collected data with a model, outputs a result, and updates the model to create a local model. The edge device communicates with other edge devices in a heterogeneous group. The edge device determines group membership and determines a leader edge device. The edge device receives a request for the local model, transmits the local model to the leader edge device, receives a mixed model created by the leader edge device performing a mix operation of the local model and a different local model, and replaces the local model with the mixed model.

20 Claims, 7 Drawing Sheets

(56) References Cited

U.S. PATENT DOCUMENTS

2013/0290223 A1 10/2013 Chapelle et al.
2015/0019214 A1 1/2015 Wang et al.

OTHER PUBLICATIONS

Agarwal et al., "Distributed Delayed Stochastic Optimization," in Shawe-Taylor et al., eds., Advances in Neural Information Processing Systems, 2011, vol. 24: 873-881.
Bischof et al., "MDL Principle for Robust Vector Quantization," Pattern Analysis and Applications, 1999, 2: 59-72.
Crammer et al, "Online Passive-Aggressive Algorithms," Journal of Machine Learning Research, Mar. 2006, vol. 7: 551-585.
Crammer et al., "Exact Convex Confidence-Weighted Learning," in Koller et al., eds., Advances in Neural Information Processing Systems, 2008, vol. 21: 345-352.
Crammer et al., "Multiclass Confidence Weighted Algorithms," Proceedings of the 2009 Conference on Empirical Methods in Natural Language Processing, 2009a, pp. 496-504.
Crammer et al., "Adaptive Regularization of Weight Vectors," Advances in Neural Information Processing Systems, Curran, 2009b, vol. 22: 414-422.
Crammer "Learning via Gaussian Herding," Advances in Neural Information Processing Systems, MIT Press, 2010, vol. 23: 451-459.
Dejong al., "An Analysis of the Interacting Roles of Population Size and Crossover in Genetic Algorithms," Proc. First Workshop Parallel Problem Solving from Nature, Springer-Verlag, Berlin, 1990, pp. 38-47.
Dempster et al., "Maximum Likelihood from Incomplete Data via the EM Algorithm," Journal of the Royal Statistical Society, Series B, 1977, 39(1): 1-38.
Dhillon et al., "Kernel k-means: spectral clustering and normalized cuts." KDD 2004: 551-556.
Dredze et al., "Confidence-Weighted Linear Classification," Proceedings of the 25th International Conference on Machine learning, ICML, 2008, pp. 264-271.
Freund et al., "A Decision-Theoretic Generalization of On-Line Learning and an Application to Boosting," Journal of Computer and System Sciences, 1997, vol. 55(1): 119-139.
Grefenstette, "Optimization of Control Parameters for Genetic Algorithms," IEEE Trans. Systems, Man, and Cybernetics, vol. SMC-16, No. 1, Jan./Feb. 1986, pp. 122-128.
Hido, "Jubatus: Real-Time and Highly-Scalable Machine Learning Platform," presented at Hadoop Summit 2013, San Jose, CA, Jun. 2013 (41 pages).
Holland, Adaptation in Natural and Artificial Systems, MIT Press, Cambridge, MA, 1992 (227 pages).
Jubatus Development Team, Jubatus git repository on GitHub, http://jubat.us/en (4 pages).
Jubatus Development Team, Jubatus hands-on tutorial, http://jubat.us/en/tutorial.html (6 pages).
Jubatus Development Team, Jubatus: Distributed Online Machine Learning Framework, https://github.com/jubatus/jubatus (4 pages).
Lamport, "The Part-Time Parliament," ACM Transactions on Computer Systems, May 1998, vol. 16(2): 133-169.
Macqueen, "Some Methods for Classification and Analysis of Multivariate Observations," Proceedings of 5th Berkeley Symposium on Mathematical Statistics and Probability, University of California Press, 1967, vol. 1: 281-297.
Makino, "Scalable Distributed Online Machine Learning Framework for Real-time Analysis of Big Data," presented at the 6th Extremely Large Databases Conference, Stanford, CA, Sep. 2012 (7 pages).
McDonald et al., "Distributed Training Strategies for the Structured Perceptron," Human Language Technologies: The 2010 Annual Conference of the North American Chapter of the Association for Computational Linguistics, 2010, pp. 456-464.
Ongaro et al., "In Search of an Understandable Consensus Algorithm," 2014 (18 pages).
Niu et al., "Hogwild!: A Lock-Free Approach to Parallelizing Stochastic Gradient Descent," in Shawe-Taylor, J., et al., eds., Advances in Neural Information Processing Systems, 2011, vol. 24: 693-701.
Rosenblatt, "The Perceptron: A Probabilistic Model for Information Storage and Organization in the Brain," Psychological Review, 1958, vol. 65(6): 386-408.
Schapire, "The Strength of Weak Learnability," Machine Learning, 1990, vol. 5(2): 197-227.
Zhang et al., "Communication-Efficient Algorithms for Statistical Optimization," Journal of Machine Learning Research, Jan. 2012, vol. 14(1): 3321-3363.
Langford et al., "Slow Learners are Fast," in Bengio, et al., eds., Advances in Neural Information Processing Systems, 2009, vol. 22: 2331-2339.
Wang et al., "Kernel Trick Embedded Gaussian Mixture Model," Lecture Notes in Artificial Intelligence, 2003, vol. 2842: 159-174.
Wolpert, "Stacked Generalization," Neural Networks, 1992, 5(2): 241-259.

\* cited by examiner

MACHINE LEARNING HETEROGENEOUS EDGE DEVICE, METHOD, AND SYSTEM

CROSS-REFERENCE TO RELATED APPLICATIONS

The present application relates to co-pending patent application Ser. No. 14/602,843 entitled "Machine Learning With Model Filtering And Model Mixing For Edge Devices In A Heterogeneous Environment," filed on Jan. 22, 2015, the entire content of which is hereby incorporated by reference herein.

BACKGROUND

A machine learning device uses a machine learning model to process collected data and output a result. The machine learning device may use feedback to update or improve the machine learning model. For example, a machine learning device may use a regression analysis model to make a prediction, and may then update the regression analysis model based on feedback that indicates whether the prediction was correct. A variety of types of machine learning models exists (e.g., linear regression model, naïve Bayes classifier). Machine learning models are commonly used for addressing "Big Data" problems, where the volume of data to be processed may be great and/or real time data processing may be desired.

SUMMARY

The present disclosure provides a new and innovative machine learning heterogeneous edge device, method, and system. In an example embodiment, an edge device includes a communication module configured to communicate with a plurality of different edge devices, a data collection device configured to collect a first type of data, a memory configured to store data collected by the data collection device, a machine learning module, a group determination module, and a leader election module. The edge device may be configured to analyze, using a first model relating to a predefined task, first data collected by the data collection device, output a result including at least one of a prediction, a classification, a clustering, an anomaly detection, and a recognition, and update, based on a correctness of the result, the first model to create a first local model which relates to the predefined task. The edge device may communicate with at least one other edge device in a first heterogeneous group of edge devices, where the first heterogeneous group of edge devices includes at least a first edge device and a second edge device, and the first edge device collects and analyzes the first type of data and the second edge device collects and analyzes a different second type of data. The edge device may determine membership of a second heterogeneous group of edge devices from the first heterogeneous group of edge devices, the second group of edge devices being a subset of the first heterogeneous group of edge devices. The edge device may determine a leader edge device from the second heterogeneous group of edge devices. The edge device may receive, from the leader edge device, a request for the first local model, transmit the first local model to the leader edge device, receive, from the leader edge device, a mixed model which relates to the predefined task, where the mixed model is created by the leader edge device performing a mix operation of a plurality of the first local model and at least one different respective local model, and replace the first local model with the mixed model.

Additional features and advantages of the disclosed method and apparatus are described in, and will be apparent from, the following Detailed Description and the Figures.

DETAILED DESCRIPTION OF EXAMPLE EMBODIMENTS

Figure 1:
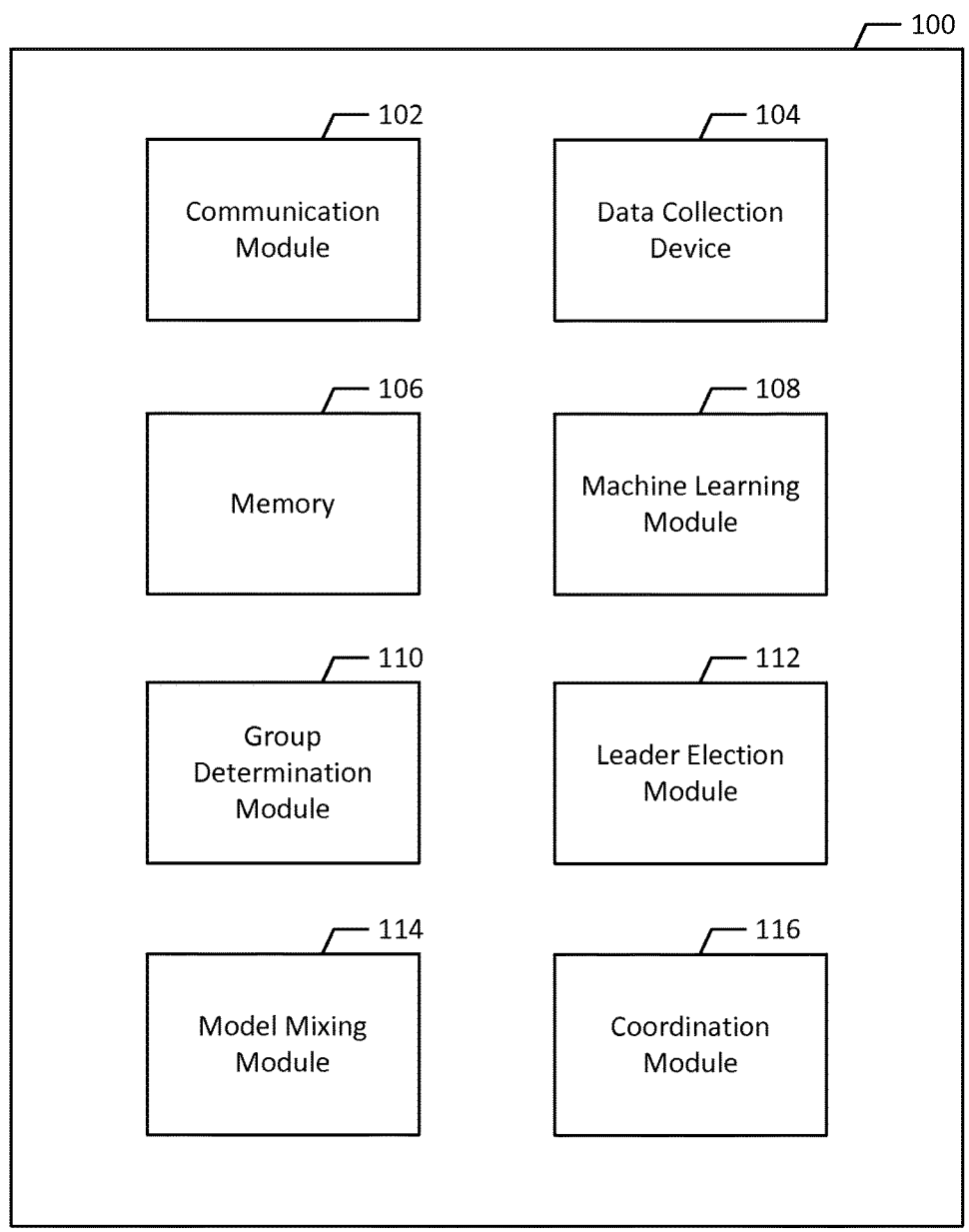
FIG. 1 is a block diagram of an example of an edge device, according to an example embodiment of the present disclosure.

FIG. 1 is a block diagram of an example of an edge device 100, according to an example embodiment of the present disclosure. In an example embodiment, the edge device 100 may be a video camera. In another example embodiment, the edge device 100 may be a shopping cart. The edge device 100 is a device that is capable of performing communication with other devices, performing data collection, and performing machine learning. In an example embodiment, an edge device 100 is on the edge, or outermost layer, of a large distributed network of data connected devices, including central servers, intermediate servers, data repositories, gateways, routers, and the like. Edge devices 100 may include a wide variety of devices including recording devices (e.g., digital cameras, video cameras, audio recorders), city management devices (e.g., parking sensors, traffic sensors, water quality devices), vehicles (e.g., cars, trucks, airplanes), body sensors (e.g., activity sensors, vital signs sensor, pedometers), environmental sensors (e.g., weather sensors, pollution sensors, air quality sensors), wearable computing devices (e.g., smart watch, glasses, clothes), personal computing devices (e.g., mobile phone, tablet, laptop), home devices (e.g., appliances, thermostats, light systems, security system), advertising devices (e.g., billboards, information kiosks), etc. The edge device 100 may include a communication module 102, a data collection device 104, a memory 106, a machine learning module 108, a group determination module 110, a leader election module 112, a model mixing module 114, and a coordination module 116.

The communication module 102 is configured to communicate with other devices including other edge devices 100 of the same type (e.g., multiple video cameras) or of a different type (e.g., a video camera and a shopping cart). For example, as described in further detail below, the communication module 102 may be configured to communicate with other devices via one or more networks or communications channels, including the Internet, or any suitable wide area network, local area network, gateway, or other communication channel or network. For example, the communication module 102 may be configured for wireless communications via multiple protocols employed by cellular networks (e.g., 4G, 3G, GSM), wireless local area network (e.g., Wi-Fi), satellite (e.g., VSAT), or any suitable form of wireless communication (e.g., Bluetooth, RFID, NFC, IrDA, Li-Fi). Also, for example, the communication module 102 may be configured for a wired connection to another edge device 100 (e.g., Ethernet, DSL, USB, RS-232, coaxial cable). Further, the communication module 102 may communicate with a user, for example, via a graphical user interface implemented with a touch screen display. The user may be able to request the edge device 100 to perform a specific task and/or receive information from the edge device 100. Thus, the communication module 102 may include hardware and/or software configured to communicate via one or more communication interfaces using one or more communication protocols.

A data collection device 104 may be a sensor, detector, or any device suitable for real time collection of data representative of real world characteristics (e.g., speed, acceleration, items in a shopping cart, hand movements, shapes, temperature, angles, voice recognition, word recognition, torque, slip levels). The data collection device 104 may receive a continuous data stream or collect data on a periodic basis (e.g., every millisecond, second, minute), which may generally depend on the type of data being collected and the variability of the data stream. A data collection device 104 typically includes specific hardware and/or physical structures specifically configured to collect a certain type of data (e.g., an image sensor, an accelerometer, a gyroscope sensor, a thermometer, an altimeter, a hall effect sensor, a velocimeter, a photodetector, a flow sensor, a strain gauge, a torque sensor, a tachometer, a clinometer, a microphone, a magnetometer, a voltmeter, an ammeter, an ohmmeter, a chemical sensor, a pressure sensor, a rain sensor, a hygrometer, a humistor, an anemometer, a seismometer, a geiger counter, etc.). In an example embodiment, one edge device 100 may include multiple different data collection devices 104 that collect different types of data. The data collection device 104 provides the collected data to the memory 106. In an example embodiment, the memory 106 may be specialized memory for receiving and storing large amounts of data, such as video image data (e.g., VRAM). Thus, the memory 106 may have specialized hardware which is task specific, for example, to meet high throughput and low latency specifications of the edge device 100. The memory 106 may include different tiers of memory, such as buffers, shift registers, and the like. The memory 106 may be configured to store the collected data temporarily, and may be overwritten once the collected data is no longer needed by the machine learning module 108.

A machine learning module 108 executes a machine learning model using the data collected by the data collection device 104 and stored in memory 106. The machine learning module 108 receives the collected data as inputs and executes the machine learning model using the collected data to make a prediction, a classification, a clustering, an anomaly detection, and/or a recognition, which is then output as a result. The machine learning model may iteratively update the result. For example, the machine learning model may continuously execute using all available collected data stored in memory, and may produce a continuous result or a periodic result. If the volume and velocity of data collected is relatively low (sparse and/or slow), for example, the machine learning model may only periodically execute, and may be dormant for a period of time after each result is output, while new data is collected. Each machine learning model relates to a predefined task (e.g., prediction of an item, recognition of sweethearting theft, recognition of a suspect for a be-on-the-lookout (BOLO) alert, classification of cornering speeds). For example, a machine learning model for a shopping cart edge device 100, the predefined task may be suggesting an item to a consumer. As the consumer pushes the shopping cart around, while walking throughout a grocery store and shopping, the machine learning module 108 of the shopping cart may output a prediction on which item the consumer is most likely to purchase if that item is suggested to the consumer. The prediction may be based on other items in the consumer's cart. Further, additional information, such as the consumer's age, sex, race and/or ethnicity may also be used to make the prediction of which item is most likely to be purchased. In an example embodiment, a machine learning module 108 may include several machine learning models, where each machine learning model may be specific to a subset or category (e.g., category of male consumers over 40 years of age), in which case two, four, eight, or sixteen different models for a single predefined task may be selected from, depending on the situation and the number of variables used to specify a machine learning model.

Figure 2:
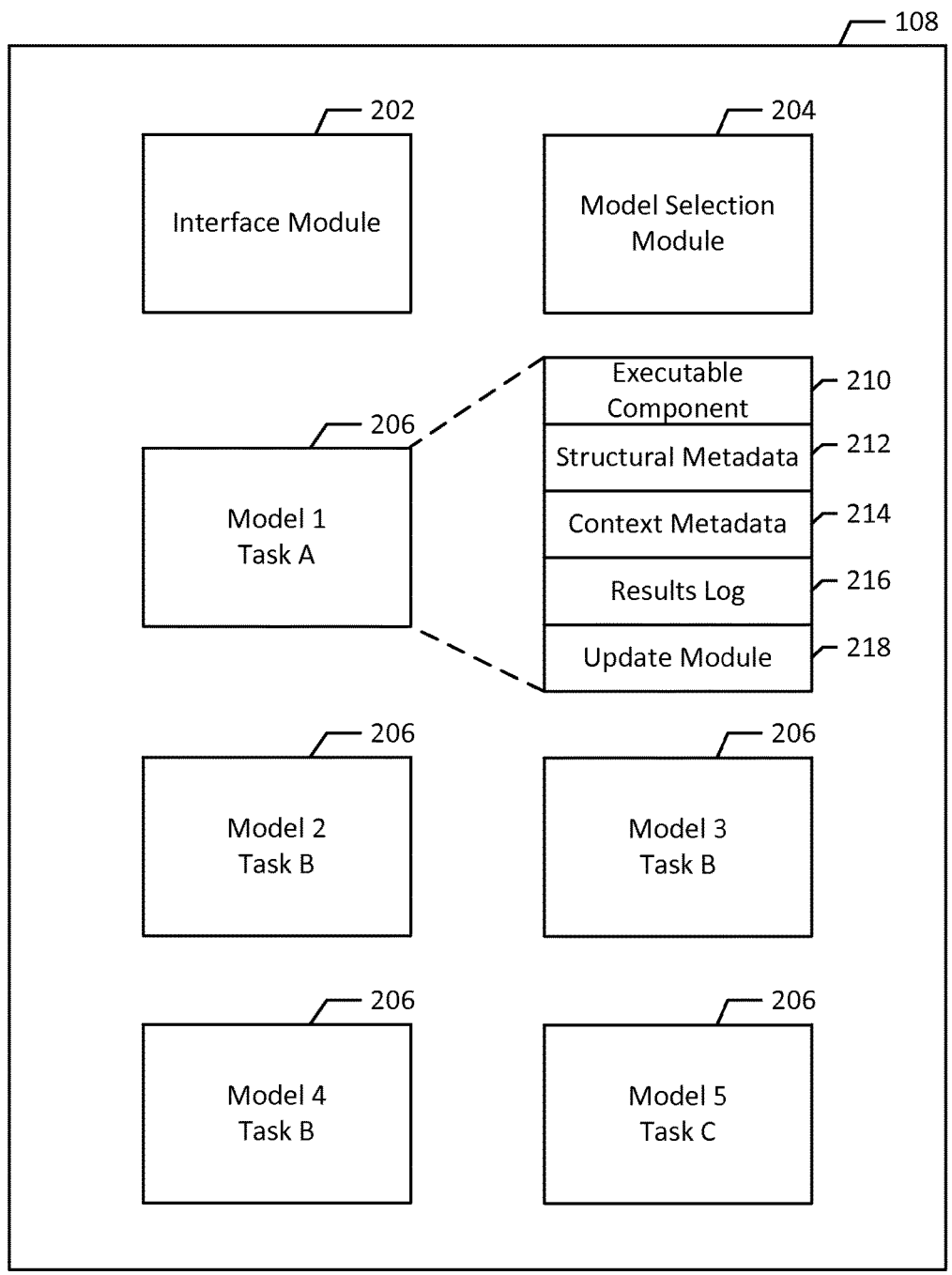
FIG. 2 is a block diagram of an example machine learning module, according to an example embodiment of the present disclosure.

FIG. 2 is a block diagram of an example machine learning module 108, according to an example embodiment of the present disclosure. The machine learning module 108 may include an interface module 202, a model selection module 204, and one or more machine learning models 206. As described herein, a machine learning model 206 may simply be referred to as a model 206 for brevity. The interface module 202 is an interface between the machine learning module 108 and other modules or components within the edge device 100 (e.g., memory 106, communication module 102). The model selection module 204 receives information including which predefined task is to be analyzed, and may include information for choosing from multiple models 206 to select the appropriate model 206 (e.g., male consumers over 40 years of age) for the predefined task. As shown in FIG. 2, Model 1 relates to a predefined Task A, while Models 2, 3, and 4 relate to a different predefined Task B, and Model 5 relates to another different predefined Task C. In an example embodiment, an edge device 100 may switch tasks periodically. For example, a first predefined task may be handled during business hours, and after hours, a second different predefined task may be handled. A model 206 may be provided to an edge device 100, for example, at the time of manufacture, or may be loaded onto the edge device 100 at a later time from another device, either as a new model 206 or as an updated version of a model 206. The machine learning model 206 includes an executable component 210, which is executed to process the collected data as inputs to generate results as outputs of the model 206. The machine learning model 206 includes structural metadata 212, such as the type of the model (e.g., linear classifier, linear or logistic regression model, decision tree, clustering model, bayesian model, neural network) and structure of the model (e.g., parametric fixed structure or non-parametric, number and structure of parameters, input variable(s), output variable(s), data type, feature definitions). The structural metadata 212 may include any necessary information for identifying what the model 206 is and what the model 206 does, so that the model 206 can be used for distributed machine learning, as will be discussed further below. The machine learning model 206 may also include context metadata 214 (e.g., data collection environment, model history, model stability), which may describe the contextual situation in which the model has been or is operating. In an example embodiment, context metadata may indicate a geographic location of a video camera edge device 100, and may indicate that the video camera is operating in a dark environment or a bright environment, and/or in an indoor environment or an outdoor environment. The machine learning model 206 includes a results log 216, which may store results, for example, for a period of time or a specific number of results. The results log 216 may also include summary statistics or other information, for example, which may be useful for analysis of the model 206. The results log 216 may include a summary of collected data that was previously stored in the memory 106, but has been overwritten by new collected data. The machine learning model 206 includes an update module 218, which determines whether the model 206 should be updated based on feedback on the results output from the model 206. For example, if the model 206 makes predictions that are correct, this does not indicate that the model should be updated, but if the model 206 makes incorrect predictions, this tends to indicate that the model may be improved. Thus, the update module 218 may update the machine learning model 206 based on internal analysis, and may also update based on an outside instruction to update. When a model 206 is updated by the update module 218, the model 206 is then local to the specific edge device 100 that the model 206 resides on, and may thus be referred to as a local model 206, as opposed to a global model 206. A manufacturer may provide new edge devices 100 with global models 206, and then each edge device 100 may update their models 206, resulting in local models 206 that are different from the global model 206. A local model 206 may be trained based on a specific environment to provide better results in that specific environment than the global model 206 provides.

A group determination module 110 determines which edge devices 100 will form a group that will participate in an analysis of the machine learning models 206 on the edge devices 100 that are members of the group. Group membership may be based on geographic proximity between edge devices 100. A leader election module 112 determines which edge device 100 should act as a leader for a group of edge devices. A leader may be elected by using a consensus protocol which may receive input from all of the members of a group. A model mixing module 114 is used by a leader edge device 100 to mix local models 206 from different edge devices 100 in the group to create a mixed model 206. A model mixing module 114 may mix models 206 using several different techniques depending on the models 206 to be mixed. A coordination module 116 may coordinate the processes of the communication module 102, the data collection device 104, the memory 106, the machine learning module 108, the group determination module 110, the leader election module 112, and the model mixing module 114. An edge device 100 may have a central processing unit, and may also have one or more additional processors dedicated to various specific tasks. Each edge device 100 may use one or more processors, memories, buses, and the like. Also, each one of the communication module 102, the data collection device 104, the memory 106, the machine learning module 108, the group determination module 110, the leader election module 112, the model mixing module 114, and the coordination module 116 may use one or more processors, memories, buses, and the like. A processor, memory, and any other component may be shared by one or more of the communication module 102, the data collection device 104, the memory 106, the machine learning module 108, the group determination module 110, the leader election module 112, the model mixing module 114, and the coordination module 116. In an example embodiment, each one of the communication module 102, the data collection device 104, the memory 106, the machine learning module 108, the group determination module 110, the leader election module 112, the model mixing module 114, and the coordination module 116 uses some dedicated hardware and software that is distinct from each other module or component.

An edge device 100 as shown in FIG. 2 may interface with the physical world using a sensor, then using the data collected by the sensor, autonomously execute a machine learning model 206, and communicate with other devices regarding the machine learning performed using the machine learning model 206. With regard to the example of a shopping cart, the edge device 100 may be a shopping cart that integrally includes all the components and functionality of an edge device 100, or alternatively, a shopping cart could include an installed edge device 100 which is configured to be secured to a standard pre-existing shopping cart. Thus, for example, a grocery store could install the edge device 100 onto a regular shopping cart. In another example embodiment, an ordinary automobile may include a traction control system that is adapted to form an edge device 100 by downloading software modules which use existing data collection devices in the automobile. Moreover, a wide variety of different types of devices may be adapted to be edge devices 100 (e.g., a shopping cart, an automobile, a thermostat, a GPS device), and thus, a heterogeneous group of edge devices 100 may be formed when an edge device(s) 100 communicates with another different type of edge device(s) 100. A heterogeneous group of edge devices differs from a homogeneous group of edge devices 100, which includes only edge devices 100 that are the same type of device and perform the same type of data collection and the same type of machine learning.

Figure 3A:
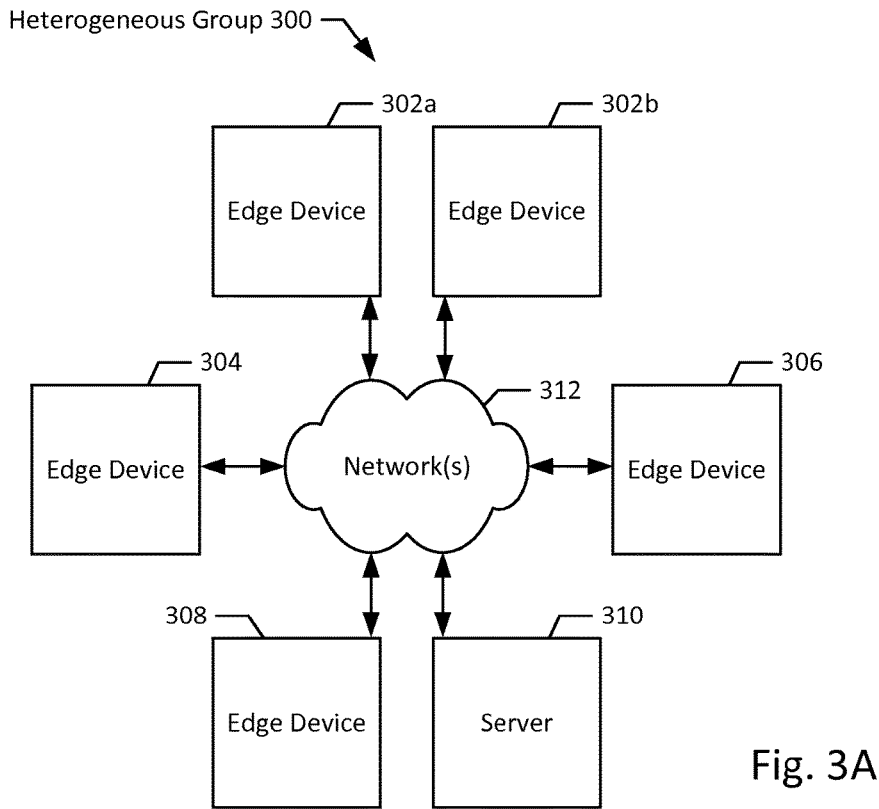
FIG. 3A is high level block diagram illustrating a heterogeneous group of edge devices, according to an example embodiment of the present disclosure.

FIG. 3A is high level block diagram illustrating a heterogeneous group of edge devices, according to an example embodiment of the present disclosure. The heterogeneous group 300 includes two edge devices 302*a* and 302*b*, which are both the same type of edge device 100 (e.g., both video cameras 302). The heterogeneous group 300 also includes three more edge devices 304, 306, and 308, which are each different types of devices 100 (e.g., one thermostat, one automatic teller machine, and one shopping cart). A server 310 may communicate with one or more of the edge devices 302*a*, 302*b*, 304, 306, 308 via a network 312. The server 310 may communicate with one or more edge devices 100. In an example embodiment, the server 310 is an intermediate server, which communicates with one or more edge devices 100 and with one or more different servers (e.g., a central server). In an example embodiment, server 310 may be part of a "cloud" which performs cloud computing. The server 310 may provide information and/or commands to edge devices 100, and may receive information, for example, regarding history and/or accuracy of local models 206. For example, the server 310 may provide an updated model 206 based on a manufacturer update. The server 310 may perform many of the same functions as an edge device, but unlike an edge device 100, a server 310 does not perform data collection using a data collection device 104. The network 312 may include one or more networks and/or communication paths, and may be configured as a peer-to-peer network. In an example embodiment, the heterogeneous group 300 may be configured in any type of network 312 (e.g., LAN, WAN, Wi-Fi, BT, Z-wave, satellite, terrestrial, etc.) and may be configured in any suitable network topology (e.g., mesh, bus, grid, ring, star, tree, line).

Figure 3B:
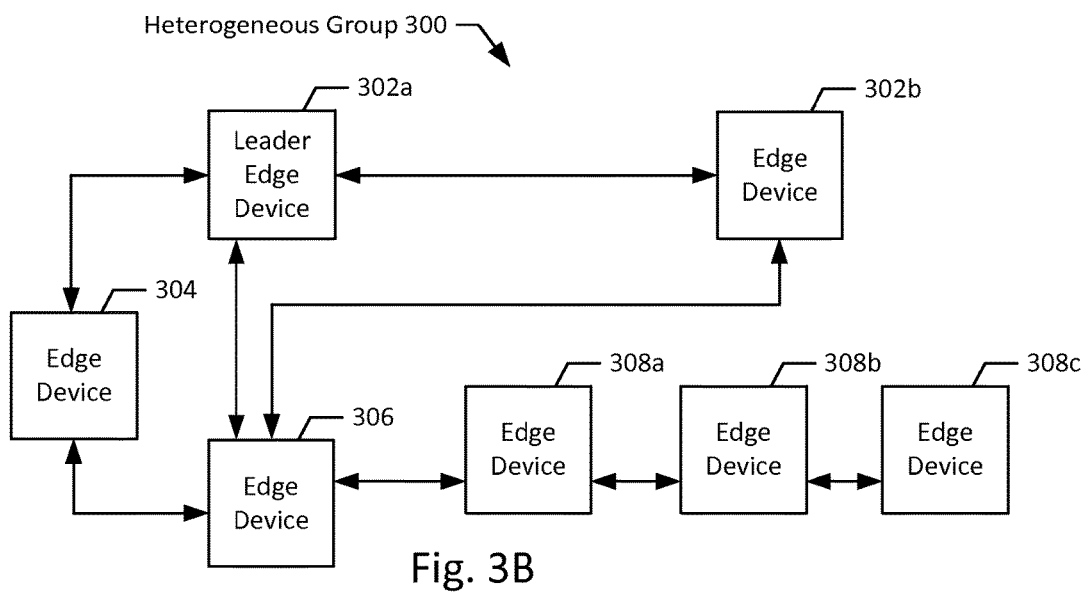
FIG. 3B is block diagram illustrating a heterogeneous group of edge devices, according to an example embodiment of the present disclosure.

FIG. 3B is block diagram illustrating a heterogeneous group of edge devices, according to an example embodiment of the present disclosure. As shown in FIG. 3B, the heterogeneous group 300 is provided as a semi-connected mesh network of edge devices 302a, 302b, 304, 306, 308a, 308b, 308c that includes four different types of edge devices (e.g., video cameras 302, thermostat 304, automatic teller machine 306, and shopping carts 308). As described herein, when referencing edge devices 100, two different types of edge devices 302, 304 may be indicated by the different reference numerals 302 and 304 (e.g., a video camera and a thermostat), or two of the same type of edge device may be indicated by the same reference numeral 302a and 302b with the letters "a" and "b" indicating multiple different edge devices of the same type are referenced (e.g., two video cameras 302). Also, edge devices 100 may be referred to herein with reference numeral 100 without specifying whether the edge devices 100 are the same or different types of edge devices 100.

In an example embodiment, multiple different types of network communications (e.g., Wi-Fi, 4G, BT, NFC, Li-Fi, IrDA) may be used within a heterogeneous group 300 so that an edge device 100 which is only capable of one type of communication may be in a heterogeneous group 300 with another edge device 100, which is only capable of a different type of communication, through an edge device 100 acting as an intermediary which is capable of both forms of communication. In an example embodiment, the network 312 may be a wireless mobile ad hoc mesh network (e.g., MANET, VANET, SPAN). In an example embodiment, the network 312 may be a scatternet. As described herein, a heterogeneous group 300 of edge devices 100 may simply be referred to as a group 300 for brevity. A group 300 is often susceptible to variations in the group 300. For example, edge devices 100 in the group 300 may unexpectedly lose communication with the group 300. For example, an edge device 100 may lose power (e.g., unplugged and/or batteries die), may be moved to an area with limited or no connectivity due to interference (e.g., mountains, rain), or may be turned off by a user. Thus, a group 300 is typically operating in heterogeneous environment that is not static, but rather, typically changes dynamically with different edge devices 100 spontaneously and/or unexpectedly entering and leaving the group 300. In an example embodiment, the heterogeneous group 300 may have edge devices 100 including one or more of shopping carts, automobiles, surveillance cameras, automatic teller machines, GPS devices, medical devices, robots, remote controls, smoke detectors, head mounted displays, or any other edge device 100, as discussed in the present application. In an example embodiment, the heterogeneous group 300 includes a plurality of edge devices 100 which are part of the Internet of Things (IoT), which is rapidly growing and already includes billions of devices. As shown in FIG. 3B, edge device 302a has been designated as a leader edge device 302a, which is a device that functions as a leader for a group 300, which will be discussed in further detail below.

Figure 4:
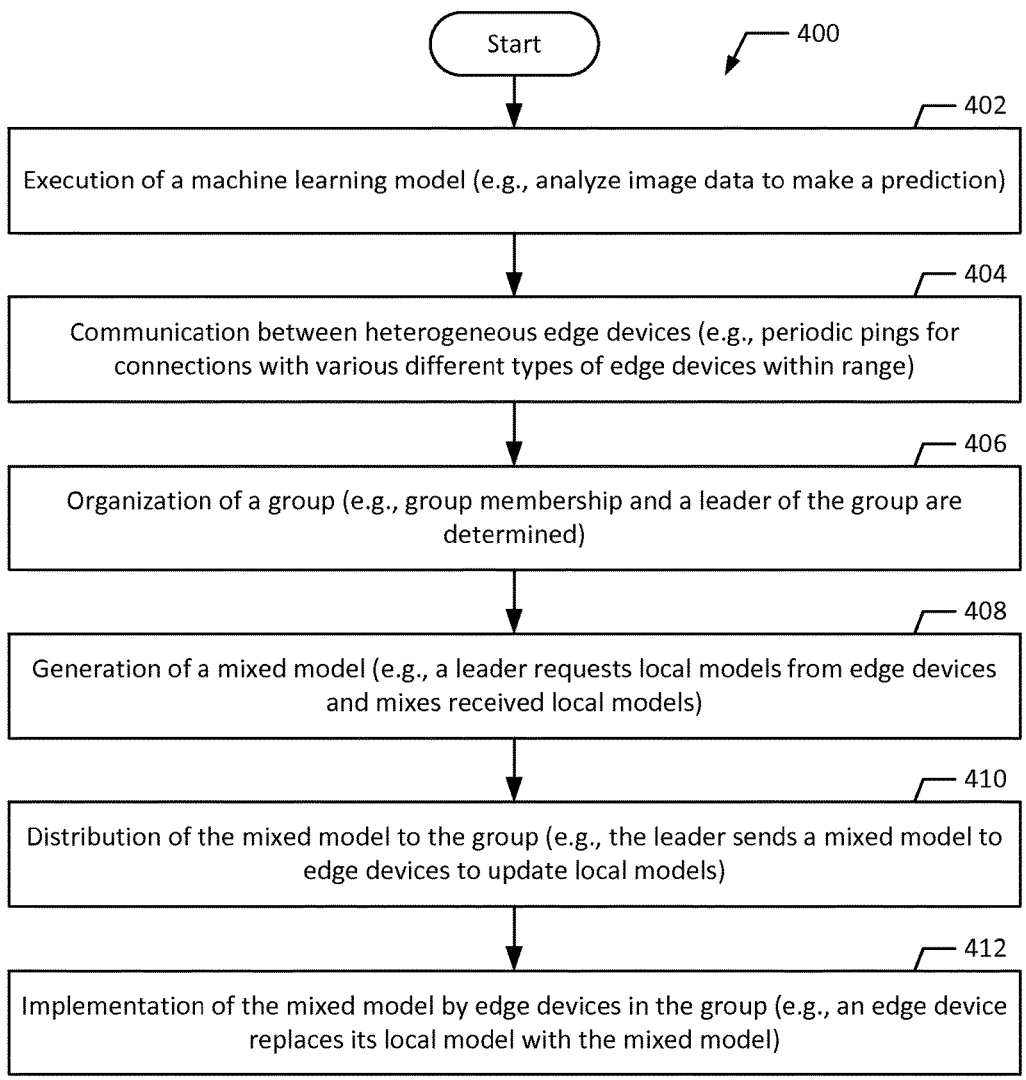
FIG. 4 is a flowchart illustrating an example process for machine learning in a heterogeneous group of edge devices, according to an example embodiment of the present disclosure.

FIG. 4 is a flowchart illustrating an example process for machine learning in a heterogeneous group of edge devices, according to an example embodiment of the present disclosure. Although the process 400 is described with reference to the flowchart illustrated in FIG. 4, it will be appreciated that many other methods of performing the acts associated with the process 400 may be used. For example, the order of some of the blocks may be changed, certain blocks may be combined with other blocks, and some of the blocks described are optional.

The example process 400 may begin with execution of a machine learning model (block 402). For example, an edge device 100 may use a machine learning model 206 to analyze image data to make a prediction. In an example embodiment, where an edge device 308 is a shopping cart, the model 206 executed by the shopping cart may relate to the predefined task of suggesting an item to a consumer. In an example embodiment, where an edge device 302 is a video camera, the model 206 executed by the video camera may relate to the predefined task of sweethearting recognition. In an example embodiment, an edge device 100 simultaneously executes more than one machine learning model 206, for example, when two different machine learning models 206 directed to two different tasks are concurrently executing. The two different machine learning models 206 may use the same collected data or may use different data collected from different data collection devices 104 (e.g., image sensor and microphone). Also, some machine learning models 206 may use multiple different types of data collected from different data collection devices 104.

The example process 400 includes communication between heterogeneous edge devices (block 404). For example, edge devices 100 may send periodic ping messages seeking connections with various different types of edge devices 302, 304, 306, 308 within range. In an example embodiment, a video camera and a shopping cart may communicate when the shopping cart is brought into close proximity with the video camera, for example, in a check out lane when the consumer is paying for goods in the shopping cart. In an example embodiment, the range is set based on a time to live for ping messages or a number of hops through intermediate devices. In an example embodiment, the range may be limited to an effective range dictated by signal power, interference, etc. (e.g., a Bluetooth range of 30 feet based on power class and line of sight without interference). In an example embodiment, the range may be set by geographic delineations. The execution of machine learning models 206 and the communication between heterogeneous edge devices 100 may occur simultaneously, such that the edge devices 100 may maintain communication with known edge devices 100, and make new connections with newly available edge devices 100, for example, that have be moved within range for communication, while continually executing a machine learning model 206 on an incoming stream of data collected by the data collection device 104.

The communicating edge devices 100 perform organization of a group 300 (block 406). For example, group membership and a leader of the group 300 are determined. In an example embodiment, edge devices 302a, 302b, 304, 306, 308a, 308b, 308c (e.g., video cameras, a thermostat, an automatic teller machine, and shopping carts) are determined to be members of the group 300, as illustrated in FIG. 3B, and the group 300 may collectively determine a leader edge device 302a. Members of the group 300 may be involved in distributed machine learning within the heterogeneous group 300, and the leader edge device 302a (e.g., a video camera) may lead the distributed machine learning of the group 300. For example, the leader edge device 302a may determine a structure for periodically communicating with the group 300 in order to determine whether models 206 of different edge devices (e.g., 302a and 302b) should be mixed. Also, the group 300 may be in communication with a server 310 (e.g., an intermediate server), which may monitor the group 300 (e.g., record information relating to history and mixing of models 206) and/or provide updated models 206 to the group 300. In an example embodiment, the server 310 may participate in organization of a group 300. Also, a server 310 may monitor many different groups 300 and may receive information on history and accuracy of local models 206. In an example embodiment, group membership and determination of leader edge device 302a may be based on geographic proximity and/or connection signal strength between edge devices 100.

A mixed model is generated (block 408). For example, a leader 302a requests local models 206 from edge devices 100 and mixes received local models 206. In an example embodiment, the leader 302a which is a video camera mixes two local models 206 from two shopping carts to generate a mixed model 206 relating to suggesting an item to a consumer. The leader 302a may determine which models 206 are capable of being mixed, and also determine whether it is appropriate to mix the models 206 that are capable of being mixed, based on the structural metadata, context metadata, data distribution, etc. The leader may perform a mix operation (e.g., averaging operation, genetic algorithm operation, enumeration operation, ensemble operation) on two local models 206 to create a mixed model 206.

A mixed model is distributed to the group (block 410). For example, the leader 302a sends a mixed model 206 to edge devices 100 to update local models 206. The mixed model 206 may then be implemented by edge devices 100 in the group 300 (block 412). For example, an edge device 100 replaces its local model 206 with the mixed model 206. In an example embodiment, shopping carts each replace a local model 206 for suggesting an item to a consumer with a mixed model 206 that is received from the leader 302a. The example process 400 may be an ongoing process that is periodically repeated at a set interval. For example, blocks 402 through 412 may typically occur over a time period of 30 seconds, but the duration of this time period may be shorter or longer, for example, depending upon the velocity and volume of data collected (e.g., 1 second, 5 minutes), the computing power of a leader 302a, speed of communication between edge devices 100, the extent of model mixing required, etc. For example, if a time period is 1 second, the collected data may be highly variable within seconds, and it may be critical that the model 206 is as accurate as possible (e.g., automobile with self-driving features). On the other hand, if a time period is 5 minutes, the collected data may include relatively small variations over the course of minutes, and accuracy of the model 206 may not be critical (e.g., parking availability prediction). The period of time may generally include a first phase, in which machine learning models 206 are executed while communication between heterogeneous edge devices 100 is maintained (blocks 402 and 404), and a second phase, in which a group 300 is organized, models 206 are mixed, distributed, and implemented by edge devices in the group 100 (blocks 406 to 412). The first and second phases may typically overlap, and commencement of the second phase may require synchronization or a time-out period. Typically, the first phase constitutes the majority of the time period. Also, the time period may be determined dynamically, for example, based on the quantity of edge devices 100 in a group 300, computing power of a leader 302a, based on a significant change in data collected which requires a change or update to models 206, when triggered by an event (e.g., every time a consumer checks out, the consumer's shopping cart may initiate the second phase), or the like.

Figure 5:
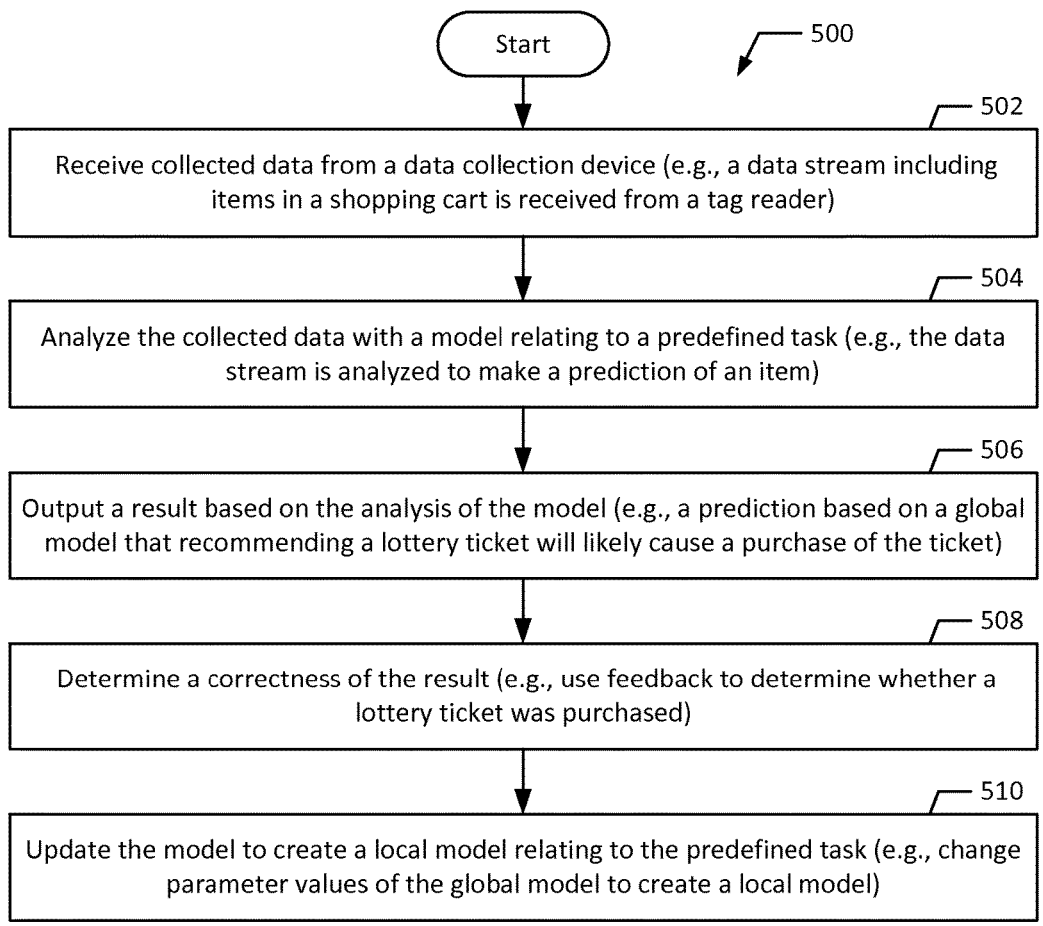
FIG. 5 is a flowchart illustrating an example process for machine learning, according to an example embodiment of the present disclosure.

FIG. 5 is a flowchart illustrating an example process for machine learning, according to an example embodiment of the present disclosure. Although the process 500 is described with reference to the flowchart illustrated in FIG. 5, it will be appreciated that many other methods of performing the acts associated with the process 500 may be used. For example, the order of some of the blocks may be changed, certain blocks may be combined with other blocks, and some of the blocks described are optional.

The example process 500 may begin with receiving collected data from a data collection device (block 502). For example, a data stream including items in a shopping cart is received from a tag reader. A shopping cart may include multiple data collection devices 104, such as a tag reader (e.g., RFID reader) and a location detection device (e.g., GPS device). For example, as a shopper moves through a grocery store, the tag reader may be used to identify items placed in the shopping cart. The memory 106 may periodically store data indicating which items are placed in the shopping cart and where the shopping cart is located in the store. For example, the memory 106 may store a current location and a list of items in the shopping cart every 0.5 seconds, thus, creating a log of the shopper's actions throughout the store. In an example embodiment, a store may track 1,000 different items on the shelves, and if one of these items is placed into the shopping cart, a vector is updated to indicate the presence or absence of the item. For example, if items 3 and 5 of the 1,000 items are placed into the shopping cart, the 1,000-term vector is updated to <0, 0, 1, 0, 1, 0, 0, . . . , 0>, which may be stored with the position in the store and a timestamp. It should be appreciated that not all items in the store must have a tag (e.g., RFID tag) that is readable by the tag reader in the shopping cart.

The collected data may be analyzed with a model relating to a predefined task (block 504). For example, the data stream collected by the shopping cart is analyzed to make a prediction of an item, which may be suggested to the shopper. In an example embodiment, the model 206 may predict an item that, if suggested to the shopper, is the most likely item to be purchased from a predefined list of items that can be suggested by the model 206 for a given day. For example, the items suggested to the shopper may be high profit margin items and/or may be items that are overstocked or soon expiring. In an example embodiment, the model 206 may have a list of three items which it may suggest (e.g., a lottery ticket, a pastry tray, or a flower bouquet). The model 206 may analyze the items placed in the cart, dwell times (e.g., more than 10 seconds in one location), movement through the store (e.g., order of aisles and bypassing aisles), the day of the week, time of day, holidays or special events (e.g., the Super Bowl), etc. For example, the collected data is input as input variables of the executable component 210 of the model 206 to analyze dwell times where a consumer stops and stands for a period of time (e.g., shopper is interested in products or is making a decision), the order that items are put in cart, the sections of the store that are bypassed, etc. All of the collected data may be analyzed by the model 206 to make a prediction of which item should be suggested to the shopper. In an example embodiment, the model 206 may include a naïve Bayes classifier, which outputs a probability of purchase for each of the lottery ticket, the pastry tray, and the flower bouquet, and the item with the highest probability of purchase may be the suggested item. As noted above, not all items in the store must have a tag (e.g., RFID tag) that is readable by the tag reader in the shopping cart, however, such items may not be considered by the model 206 for making the suggestion of an item to the consumer.

A result is output based on the analysis of the model (block 506). For example, the executable component 210 makes a prediction based on a global model 206 that recommending a lottery ticket will most likely cause a purchase of the lottery ticket. For example, a shopper may put five items in their shopping cart, and then the executable component 210 may determine the probabilities of purchase for the items (e.g., <lottery ticket, 0.847>; <pastry tray, 0.017>; <flower bouquet, 0.136>). Thus, the model 206 may output a result predicting that the lottery ticket should be suggested to the shopper. In an example embodiment, the communication module 102 may suggest the item based on the result output from the model, for example, on a digital display screen. Also, in an example embodiment, a coupon may be provided to the consumer for the suggested item. The result which is output by the model 206 may include a prediction, a classification, a clustering, an anomaly detection, and/or a recognition. As noted above, the memory 106 may store the collected data temporarily, and thus, once the collected data has been analyzed and a result is output, the memory 106 may be overwritten with new collected data. For example, the memory 106 may be overwritten every 50 milliseconds, every 500 milliseconds, every 5 seconds, or every 5 minutes.

A correctness of the result is determined by the model (block 508). For example, the model 206 uses feedback to determine whether a lottery ticket was purchased. In an example embodiment, the communication module 102 of the shopping cart may receive information from another edge device 100 (e.g., a cash register, a video surveillance camera) indicating which items were purchased, and thus, the model 206 may determine whether the suggested item was purchased or not purchased. It should be appreciated that in some cases, an edge device 100 will be unable to obtain feedback to determine a correctness of the outputted result.

The model is updated to create a local model relating to the predefined task (block 510). For example, the update module 218 changes parameter values of the global model 206 to create a local model 206. For example, if a lottery ticket was not purchased after the shopping cart suggested that the consumer purchase the lottery ticket, the update module 218 may use this feedback as training data to update parameter values in the model 206. A local model 206 may be very well trained to a specific environment after a relatively short period of time. If the environment changes, then the model 206 would generally need to be updated again, typically several times, to provide optimal results. The environment in which an edge device 100 operates in may change because the edge device 100 is moved to a different location or because the environment changes over time, or a combination of both.

It should be appreciated that the shopping cart example discussed above is merely exemplary, and models 206 may relate to any suitable predefined task, and include any suitable type of model 206 for addressing the predefined task. In an example embodiment, a model 206 may be directed to recognition of sweethearting by cashiers in a grocery store. For example, a surveillance video camera located in a check out lane may operate as an edge device 100. The video camera may collect a stream of image data, which may be analyzed by a model 206 to detect movements by a cashier's hands which indicate that the cashier is not scanning the items properly to ring up the consumer. If the model 206 determines that sweethearting is occurring or is likely occurring, a message may be sent to a store manager, who may cause the consumer's bags and receipt to be checked at the store exit. Feedback may be provided to the model 206 based on whether the consumer had items bagged that were not scanned, and the model may be updated based on the feedback. Thus, an updated local model 206 may adapt to a cashier's style of scanning items, which may be different from another model 206 for a different cashier.

In another example embodiment, a model 206 may relate to a predefined task of determining a target cornering speed for an automobile. For example, an automobile may include self-driving features, such as automatic braking based on a predicted collision, and alerts or alarms for the driver. In an example embodiment, an automobile may be an edge device 100 that includes data collection devices 104 such as a video camera for analyzing upcoming corners (e.g., curves or turns in the road). The data collection devices 104 may provide a data stream that is used to determine a sharpness of a bend, a slope of the road, and a camber of the road, a current speed or velocity, a slip angle, a tire-pavement friction, a weight of automobile, a distribution of weight, a moisture level, a temperature, etc. The model 206 may output a target speed for each upcoming corner, which may be used by the automobile for applying the brakes, alerting the user of a dangerous condition, or the like. The model 206 may be provided with feedback (e.g., tire slip, wheel differential) that is obtained while driving through the corner from data collection devices 104 in the automobile (e.g., a traction control system). As the automobile travels, the update module 218 may use feedback to improve the model 206, which may be a based on changing location (e.g., desert, mountains), changing weather (dry, raining, snowing, windy, hot, freezing), changing weight (e.g., picking up or dropping off passengers or cargo), or any other environmental changes.

Figure 6:
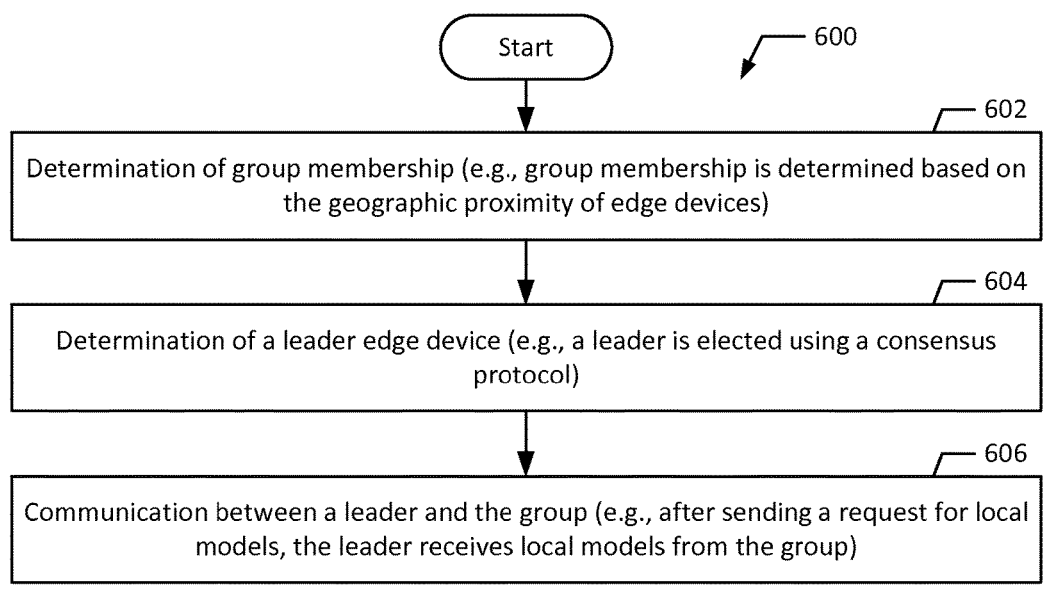
FIG. 6 is a flowchart illustrating an example process for heterogeneous group organization, according to an example embodiment of the present disclosure.

FIG. 6 is a flowchart illustrating an example process for heterogeneous group organization, according to an example embodiment of the present disclosure. Although the process 600 is described with reference to the flowchart illustrated in FIG. 6, it will be appreciated that many other methods of performing the acts associated with the process 600 may be used. For example, the order of some of the blocks may be changed, certain blocks may be combined with other blocks, and some of the blocks described are optional.

In the example process 600, edge devices 302, 304, 306, 308 which are in communication with each other may determine group membership (block 602). For example, group membership may be determined based on the geographic proximity of edge devices 100. In an example embodiment, a shopping cart and a video camera which have been in communication may determine that both devices should be members of a group 300 (e.g., based on proximity in a grocery store). For example, a group 300 including membership of a variety of edge devices 100 in the grocery store may form. An edge device 100 may be within range of more than one group 300, in which case, the edge device 100 may determine which group 300 to enter, and/or whether to leave one group 300 for another group 300 (e.g., based on location, wireless signal strength, number of devices in direct communication). For example, if an edge device 308 (e.g., a shopping cart) has only a low strength wireless connection to one edge device 306 in a group 300 (e.g., the shopping cart is outside the store in the parking lot), it may be highly likely that the edge device 308 will lose communication with the group 300. In this case, a different group 300 may be more suitable for membership. Upon entering a group 300, an edge device 100 may receive group membership information and be initialized, depending on the predefined task the edge device 100 is handling. If a predefined task is highly specific to a local environment, a new model 206 may have to be provided to the edge device 100. In an example embodiment, each edge device 100 may only be allowed to be a member of one group 300 at any given time.

The edge devices 100 which are determined to have group membership may be a subset of the group 300 of edge devices 100 that are in communication. The subset of edge devices 100 may be a strict subset (e.g., seven edge devices 100 may be maintaining communication, but two edge devices 100 may determine that they should not be members of the group 300 due to poor connectivity) or may include each edge device 100 in the group 300 (e.g., seven edge devices 100 may be maintaining communication, and all seven edge devices 100 may determine that they should be members of the group 300). In an example embodiment, one edge device 100 determines the group membership. For example, a leader 302a may determine group membership by accepting request from other edge devices 302b, 304, 306, 308 to join the group if the proximity and/or connectivity of each requesting edge device 302b, 304, 306, 308 is suitable. Also, for example, a randomly selected edge device 100 in communication with the group 300 may determine group membership.

The edge devices 100 in the group 300 may determine a leader edge device 302a (block 604). For example, a leader edge device 302a (e.g., a video camera) may be elected using a consensus protocol. As described herein, a leader edge device 302a may simply be referred to as a leader 302a for brevity. A leader 302a is capable of communicating, either directly or indirectly, with all edge devices 100 that have membership in the group 300, receiving local models 206 from edge devices 100 within the group 300, mixing the local models 206 to form mixed models 206, and distributing the mixed models 206. The leader 302a may be determined by the group 300 in a variety of different ways. For example, a leader 302a may be determined based on a user designation, a rule-based selection based on environmental conditions and/or conditions of other edge devices 100 in the group 300, a random assignment, an ID based selection (e.g., largest MAC address), a consensus protocol, or a function-based selection. For example, a predefined power function that determines the computing power of each edge device 100 may be used to select a leader 302a, and the edge device 100 that maximizes the predefined power function may be determined as the leader 302a. A predefined power function may be based on a CPU processing power, number of CPU cores, amount of memory, speed of memory, communication speed, etc., and each edge device 100 may determine its own computing power score. For example, each edge device 100 may send a computing power score to a previous leader 302a of the group 300, which will then communicate the next leader 302a to the group 300.

The leader 302a may institute communication between the leader 302a and the group 300 (block 606). For example, the leader 302a may send a request for local models 206 to the edge devices 302b, 304, 306, 308 in the group 300. After sending the request for local models 206, the leader 302a may receive local models 206 that are transmitted from the group 300. In an example embodiment, the leader 302a may receive local models 206, which relate to suggesting an item to a consumer, from edge devices 308a, 308b, 308c (e.g., shopping carts) and may receive a local model 206, which relates to sweethearting recognition, from edge device 302b (e.g., a video camera). The leader 302a may receive models 206 relating to a first predefined task and models 206 relating to a different second predefined task. The leader 302a may be executing a model 206 that relates to one or both of the first and second predefined tasks, or may not be executing a model 206 that relates to either of the first or second predefined tasks. Thus, the leader edge device 302a may be designated as the leader 302a of a group 300 even though the leader 302a may be a different type of device and may not perform machine learning relating to the same predefined tasks as one or more of the other the edge devices 304, 306, 308 within the heterogeneous group 300. As discussed above, the leader 302a may perform model mixing and distribution of mixed models.

Figure 7:
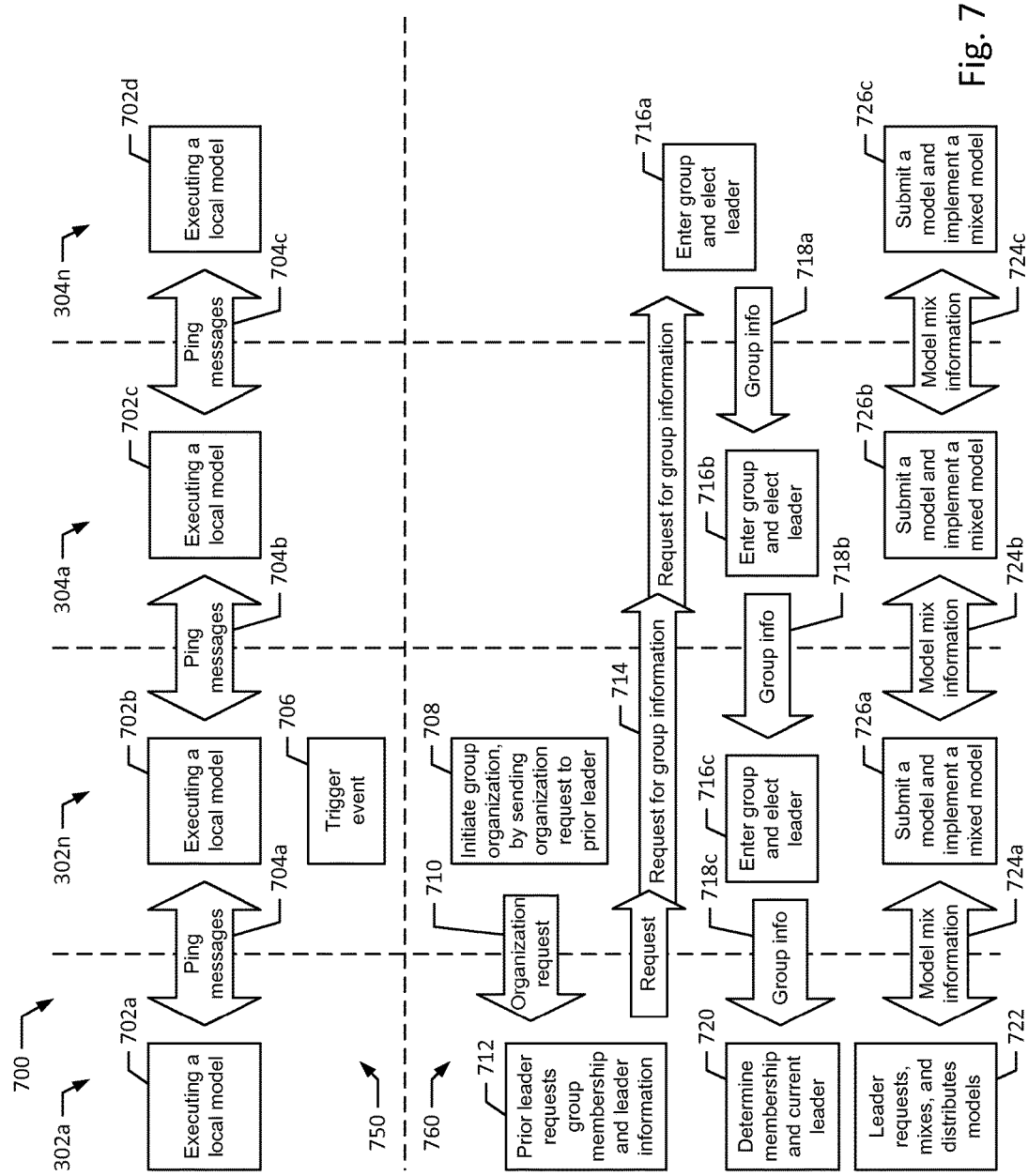
FIG. 7 is a flow diagram illustrating an example process for machine learning in a heterogeneous group of edge devices, according to an example embodiment of the present disclosure.

FIG. 7 is a flow diagram illustrating an example process for machine learning in a heterogeneous group of edge devices, according to an example embodiment of the present disclosure. Although the process 700 is described with reference to the flow diagram illustrated in FIG. 7, it will be appreciated that many other methods of performing the acts associated with the process 700 may be used. For example, the order of some of the blocks may be changed, certain blocks may be combined with other blocks, and some of the blocks described are optional or may be performed by different devices.

In the example process 700, data may flow between the edge devices 302a, 302n, 304a, 304n, for example, via the network(s) 312. The edge devices 302a, 302n, 304a, 304n may be any type of edge devices 100. Although the process for four particular edge devices 302a, 302n, 304a, 304n is shown in four separate columns, many more edge devices 100 may be involved in the process 700, and one or more servers 310 may also participate in the process 700. For example, the edge device 302n may represent a second, tenth, or fiftieth of the same type of device as edge device 302a. Likewise, edge device 304n may represent the third, twentieth, or hundredth of the same type of device as edge device 304a. Typically, not all edge devices 302a, 302n, 304a, 304n will be able to directly communicate with each other, so communications may be routed through intermediate edge devices (e.g., 302n, 304a), and/or through other devices (e.g., a router, a gateway, a server 310). Also, the process 700 illustrates a first phase 750 and a second phase 760. In the first phase 750, edge devices 302a, 302n, 304a, 304n execute models 206 and make connections and maintain communication with the other edge devices 302a, 302n, 304a, 304n, and in the second phase 760, group organization and model mixing occurs.

The example process 700 may begin with edge device 302a executing a model (block 702a). Likewise, edge device 302n is executing a model (block 702b), edge device 304a is executing a model (block 702c), and edge device 304n is executing a model (block 702d). Any or all of the executing models may be local models 206. As described above, executing models 206 may analyze collected data, which results in outputting a result. The first phase 750 may have a duration of 45 seconds, for example, during which edge device 302a may output 90 results (e.g., 2 results per second), however, different edge devices (e.g., 304a) may output more results or less results, for example, depending on the model 206 and depending upon the data stream collected by the edge device (e.g., 304a). The edge device 302a may send ping messages 704a to edge device 302n, initially to make a connection, and then to maintain the connection. Additionally, ping messages 704b and 704c are transmitted between edge devices 302n, 304a, 304n, for example. It should be appreciated that only exemplary communications are illustrated in the process 700, and that many more communications may occur, including direct communication of ping messages from edge device 302a to 304n, for example.

An edge device 302n has a trigger event occur (block 706). For example, a trigger event could be a shopping cart in a check out lane after the sale of items in the shopping cart is completed. Also, for example, a trigger event may be a time-based event (e.g., 45 seconds after the first phase 750 begins), and may be triggered by a timer expiring. In an example embodiment, an edge device 302n may be configured to have multiple different trigger events.

Once an edge device 302n has a trigger event occur, that edge device 302n may enter the second phase 760 by initiating group organization. Specifically, the edge device 302n may initiate group organization by sending an organization request 710 to the prior leader 302a of the group (block 708). In another example embodiment, the edge device 302n may directly initiate group organization, for example, by broadcasting a message to all edge devices 302a, 304a, 304n in communication with the edge device 302n. The prior leader 302a may broadcast a request for group membership and leader information (block 712). The request for group information 714 (e.g., group membership and leader election) may be routed from edge device 302n to edge device 304a and edge device 304n.

Once all edge devices 302n, 304a, 304n receive the request for group information 714, the edge devices 302n, 304a, 304n may each, using the group determination module 110, determine and send group information 718a, 718b, 718c to enter the group and perform the process for electing a leader (blocks 716a, 716b, 716c). For example, all of the edge devices 302a, 302n, 304a, 304n may determine that they should have group membership. However, for example, one or more edge devices may decline group membership, for example, if a poor wireless connection is likely to fail or cause problems in the second phase 760. Also, for example, the process for electing a leader may include a consensus protocol, a rule-based selection, a random assignment, an ID based selection, and/or a computing power function-based selection. Once the prior leader 302a has the group information 718a, 718b, 718c, the prior leader 302a will determine the group membership and the current leader using the group determination module 110 (block 720). FIG. 7 illustrates a typical example, in which the prior leader 302a is determined to be the current leader 302a again. For example, a leader 302a may repeatedly be the leader 302a for several periods of time which may generally include the first phase 750 and the second phase 760. However, if the leader 302a has a period of time in which processing capacity is reduced, then a different leader may be elected, such as an automatic teller machine which may have a high level of unused processing capacity most of the time (e.g., while not in use). As discussed above, determining group membership and determining a leader may both be performed in many different ways, and the particular determination methods may be dynamically employed by the edge devices 302a, 302n, 304a, 304n. Also, determining group membership and determining a current leader may be performed sequentially, for example, if group membership must be finalized prior to conducting a consensus protocol.

Once a leader 302a is determined, the model mixing process may begin using the model mixing module 114. The current leader 302a requests models, mixes models, and distributes models (block 722). Model mix information 724a, 724b, 724c is communicated between the leader 302a and the other edge devices 302n, 304a, 304n when the requests for models are sent. The edge devices 302n, 304a, 304n submit a model to the leader 302 and then implement a mixed model (block 726a, 726b,726c). Also, the leader 302a may implement a mixed model 206 if one of the leader's own model 206 was mixed with another model 206. Model mix information 724a, 724b, 724c may include requests, global models, local models, mixed models, which may include structural metadata, context metadata, results logs, data distributions, and the like. The leader 302a may perform filtering by structural metadata, context metadata, and data distribution for determining which models to mix. The second phase 760 may have a duration of 15 seconds, for example, after which the first phase 750 begins again.

Previously existing machine learning methods were generally useful for handling a data stream from a homogeneous environment. However, we recognize that the volume and velocity of available data in heterogeneous environments, where variation of environment is common, cannot be adequately handled using the existing methods. Attempting to address this problem with better and faster computer and/or networking hardware proves inadequate, as even the most technologically advanced computer hardware, software, and networking capabilities are not suitable for processing the volume of data at the velocity we require, while being able to handle variations in a heterogeneous environment (e.g., different types of edge devices 100 with changing connectivity). In other words, the existing machine learning techniques are generally insufficient for handling machine learning in a heterogeneous environment. On the other hand, machine learning in a heterogeneous environment with the edge devices 100 as proposed herein takes a different technological approach which was not possible using previously existing methods and systems. Accordingly, edge devices 100 and the heterogeneous environment are improved by using the methods and system as described herein.

It will be appreciated that all of the disclosed methods and procedures described herein can be implemented using one or more computer programs, modules, or components. These modules or components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be configured to be executed by one or more processors, which when executing the series of computer instructions, performs or facilitates the performance of all or part of the disclosed methods and procedures.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. An edge device comprising:
   a communication module configured to communicate with a plurality of different edge devices;
   a data collection device configured to collect a first type of data;
   a memory configured to store data collected by the data collection device;
   a machine learning module configured to execute a machine learning model using the data collected by the data collection device;
   a group determination module configured to determine which edge devices form a group of edge devices;
   a leader election module configured to determine which edge device acts as a leader for the group of edge devices;

a model mixing module configured to mix local models from different edge devices in the group of edge devices; and a coordination module configured to coordinate processes of the communication module, the data collection device, the memory, the machine learning module, the group determination module, the leader election module and the model mixing module, wherein the edge device is configured to:
- analyze, using a first model relating to a predefined task, first data collected by the data collection device;
- output a result including at least one of a prediction, a classification, a clustering, an anomaly detection, and a recognition;
- update, based on a correctness of the result, the first model to create a first local model which relates to the predefined task;
- communicate with at least one other edge device in a first heterogeneous group of edge devices, wherein the first heterogeneous group of edge devices includes at least a first edge device and a second edge device, and the first edge device collects and analyzes the first type of data and the second edge device collects and analyzes a different second type of data;
- determine which edge devices from the first heterogeneous group of edge devices form a second heterogeneous group of edge devices which are in proximity with each other, the second heterogeneous group of edge devices being a subset of the first heterogeneous group of edge devices;
- determine a leader edge device from the second heterogeneous group of edge devices;
- receive, from the leader edge device, a request for the first local model;
- transmit the first local model to the leader edge device;
- receive, from the leader edge device, a mixed model which relates to the predefined task, wherein the mixed model is created by the leader edge device performing a mix operation of a plurality of the first local model and at least one different respective local model; and
- replace the first local model with the mixed model.

2. The edge device of claim 1, wherein the first type of data is video image data and the second type of data is velocity data.

3. The edge device of claim 1, wherein the edge device is elected as the leader edge device.

4. The edge device of claim 1, wherein each edge device in the second heterogeneous group of edge devices creates a respective local model.

5. The edge device of claim 1, wherein the second heterogeneous group of edge devices includes local models that output different types of results.

6. The edge device of claim 5, wherein the different types of results include different data types.

7. The edge device of claim 5, wherein the different types of results include different output variables.

8. The edge device of claim 1, wherein a randomly selected edge device determines membership of the second group.

9. The edge device of claim 1, wherein after a first period of time, the predefined task is changed to a new task.

10. The edge device of claim 1, wherein the first model has a fixed structure.

11. The edge device of claim 1, wherein the second heterogeneous group of edge devices is a strict subset of the first heterogeneous group of edge devices.

12. The edge device of claim 1, wherein the edge device is one of a shopping cart device and a surveillance camera.

13. The edge device of claim 1, wherein the edge device is incorporated in an automobile.

14. The edge device of claim 1, wherein the edge device is an automatic teller machine.

15. A non-transitory computer readable medium storing instructions which, when executed by an edge device which comprises a communication module configured to communicate with a plurality of different edge devices, a data collection device configured to collect a first type of data, a memory configured to store data collected by the data collection device, a machine learning module configured to execute a machine learning model using the data collected by the data collection device, a group determination module configured to determine which edge devices form a group of edge devices, a leader election module configured to determine which edge device acts as a leader for the group of edge devices, a model mixing module configured to mix local models from different edge devices in the group of edge devices, and a coordination module configured to coordinate processes of the communication module, the data collection device, the memory, the machine learning module, the group determination module, the leader election module and the model mixing module, cause the edge device to:
- analyze, using a first model relating to a predefined task, first data collected by the data collection device;
- output a result including at least one of a prediction, a classification, a clustering, an anomaly detection, and a recognition;
- update, based on a correctness of the result, the first model to create a first local model which relates to the predefined task;
- communicate with at least one other edge device in a first heterogeneous group of edge devices, wherein the first heterogeneous group of edge devices includes at least a first edge device and a second edge device, and the first edge device collects and analyzes the first type of data and the second edge device collects and analyzes a different second type of data;
- determine which edge devices from the first heterogeneous group of edge devices form a second heterogeneous group of edge devices which are in proximity with each other, the second heterogeneous group of edge devices being a subset of the first heterogeneous group of edge devices;
- determine a leader edge device from the second heterogeneous group of edge devices;
- receive, from the leader edge device, a request for the first local model;
- transmit the first local model to the leader edge device;
- receive, from the leader edge device, a mixed model which relates to the predefined task, wherein the mixed model is created by the leader edge device performing a mix operation of a plurality of the first local model and at least one different respective local model; and
- replace the first local model with the mixed model.

16. A method comprising:
- communicating, by a communication module in an edge device, with a plurality of different edge devices;
- collecting, with a data collection device, a first type of data;

storing, in a memory, data collected by the data collection device;

executing, with a machine learning module, a machine learning model using the data collected by the data collection device;

determining, with a group determination module, which edge devices form a group of edge devices;

coordinating, with a coordination module, processes of the communication module, the data collection device, the memory, the machine learning module, the group determination module, the leader election module and a model mixing module;

analyzing, using a first model relating to a predefined task, first data collected by the data collection device;

outputting a result including at least one of a prediction, a classification, a clustering, an anomaly detection, and a recognition;

updating, based on a correctness of the result, the first model to create a first local model which relates to the predefined task;

communicating with at least one other edge device in a first heterogeneous group of edge devices, wherein the first heterogeneous group of edge devices includes at least a first edge device and a second edge device, and the first edge device collects and analyzes the first type of data and the second edge device collects and analyzes a different second type of data;

determining which edge devices from the first heterogeneous group of edge devices form a second heterogeneous group of edge devices which are in proximity with each other, the second heterogeneous group of edge devices being a subset of the first heterogeneous group of edge devices;

determining a leader edge device from the second heterogeneous group of edge devices;

receiving, from the leader edge device, a request for the first local model;

transmitting the first local model to the leader edge device;

receiving, from the leader edge device, a mixed model which relates to the predefined task, wherein the mixed model is created by the leader edge device performing a mix operation of a plurality of the first local model and at least one different respective local model; and replacing the first local model with the mixed model.

17. The method of claim 16, wherein the first type of data is video image data and the second type of data is velocity data.

18. The method of claim 16, wherein the edge device is elected as the leader edge device.

19. The method of claim 16, wherein each edge device in the second heterogeneous group of edge devices creates a respective local model.

20. The method of claim 16, wherein the second heterogeneous group of edge devices includes local models that output different types of results.

* * * * *